(12) United States Patent
Burns et al.

(10) Patent No.: US 12,523,402 B2
(45) Date of Patent: Jan. 13, 2026

(54) DEMAND DEFROST

(71) Applicant: Copeland Cold Chain LP, Kennesaw, GA (US)

(72) Inventors: Nathan Paul Burns, Huber Heights, OH (US); Abram Andrew Yorde, Englewood, OH (US); Emma Renee Allen, Bellbrook, OH (US); Gregory Scott Mickelson, Acworth, GA (US); Mohammed Makboul, Acworth, GA (US); Francois Aucoin, Montreal (CA); Mitchell R. Bolin, Piqua, OH (US)

(73) Assignee: Copeland Comfort Control LP, Kennesaw, GA (US)

( * ) Notice: Subject to any disclaimer, the term of this patent is extended or adjusted under 35 U.S.C. 154(b) by 175 days.

(21) Appl. No.: 18/442,728

(22) Filed: Feb. 15, 2024

(65) Prior Publication Data

US 2024/0280302 A1    Aug. 22, 2024

Related U.S. Application Data

(60) Provisional application No. 63/446,758, filed on Feb. 17, 2023.

(51) Int. Cl.
*F25B 47/02* (2006.01)
*F25D 21/00* (2006.01)
(Continued)

(52) U.S. Cl.
CPC ............ *F25B 47/02* (2013.01); *F25D 21/006* (2013.01); *G06N 3/08* (2013.01); *G06N 20/00* (2019.01);
(Continued)

(58) Field of Classification Search
CPC ....... F24F 11/41; F25B 47/02; F25B 2347/02; F25B 2500/19; F25D 21/002;
(Continued)

(56) References Cited

U.S. PATENT DOCUMENTS

| 10,627,146 B2 | 4/2020 | Wallis et al. |
| 2006/0248904 A1 | 11/2006 | Ludwig |
| 2013/0086929 A1 | 4/2013 | Senf, Jr. |

FOREIGN PATENT DOCUMENTS

| EP | 1134520 B1 | 11/2005 |
| EP | 3904777 A1 | 11/2021 |

(Continued)

OTHER PUBLICATIONS

WO 2016/088379 (English translation) (Year: 2016).*
(Continued)

*Primary Examiner* — Jonathan Bradford
(74) *Attorney, Agent, or Firm* — Harness, Dickey & Pierce, P.L.C.; Anthony G. Fussner

(57) ABSTRACT

A controller is configured to be operable for: triggering a defrost cycle when a gap between Control Temperature (CT) and Saturated Suction Temperature (SST) exceeds a defined threshold of an expected/learned gap between the Control Temperature (CT) and Saturated Suction Temperature (SST); following the defrost cycle, executing a machine learning process for a determined amount of time during which the controller learns a current expected/learned gap between the Control Temperature (CT) and Saturated Suction Temperature (SST); and averaging the current expected/learned gap with a previous expected/learned gap, which was machine learned by the controller following a previous defrost cycle, to thereby provide an average expected/learned gap usable by the controller as the previous expected/learned gap following the next defrost cycle.

14 Claims, 2 Drawing Sheets

(51) Int. Cl.
*G06N 3/08* (2023.01)
*G06N 20/00* (2019.01)

(52) U.S. Cl.
CPC ... *F25B 2347/02* (2013.01); *F25B 2700/2117* (2013.01)

(58) Field of Classification Search
CPC .... F25D 21/004; F25D 21/006; F25D 21/008; G06N 3/08; G06N 20/00
See application file for complete search history.

(56) References Cited

FOREIGN PATENT DOCUMENTS

| | | |
|---|---|---|
| JP | 2006300510 A | 11/2006 |
| KR | 20-1999-012917 | 4/1999 |
| KR | 10-2020-0087043 A | 7/2020 |

OTHER PUBLICATIONS

Case Controller 200 (CC200) and Case Display; www.climate.emerson.com; 2022; 77 pages.

European Search Report for EP24732380.1 that claims priority to the same application as the instant application; dated Feb. 13, 2025; 4 pages.

International Search Report and Written Opinion for PCT/US2024/016025 that claims priority to the same parent as the instant application; dated May 30, 2024; 9 pages.

\* cited by examiner

DEMAND DEFROST

CROSS-REFERENCE TO RELATED APPLICATION

This application claims the benefit of and priority to U.S. Provisional Patent Application No. 63/446,758 filed Feb. 17, 2023. The entire disclosure of the above application is incorporated herein by reference.

FIELD

The present disclosure generally relates to methods and controllers configured to be operable for on demand initiation of a defrost cycle, e.g., demand defrost when necessary as opposed to automatically initiating defrost cycles according to a predetermined scheduled frequency of a set amount of defrost cycles per day.

BACKGROUND

This section provides background information related to the present disclosure which is not necessarily prior art.

Conventional walk-in freezers are configured to automatically defrost at set intervals per day. For example, a walk-in freezer may be configured to automatically defrost two times daily regardless of the current conditions within the walk-in freezer.

DRAWINGS

The drawings described herein are for illustrative purposes only of selected embodiments and not all possible implementations, and are not intended to limit the scope of the present disclosure.

Figure 1:
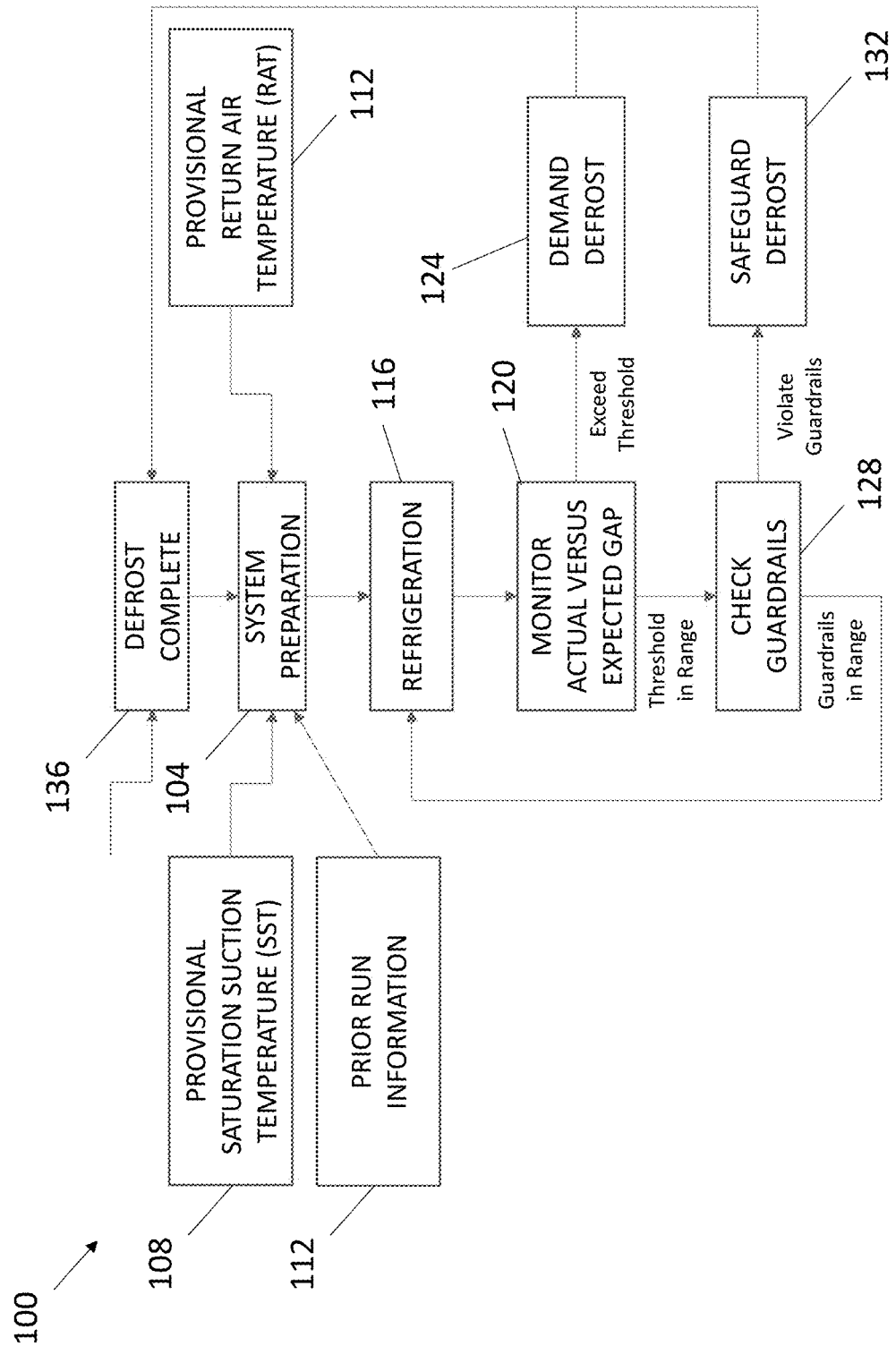

FIG. 1 is a process flow diagram of a method for on demand initiation of a defrost cycle, e.g., demand defrost when necessary as opposed to automatically initiating defrost cycles according to a predetermined scheduled frequency of a set amount of defrost cycles per day. As shown, the method includes monitoring actual gap versus the expected/learned gap between Return Air Temperature (RAT) (broadly, Control Temperature (CT)) and Saturation Suction Temperature (SST). If the monitored actual gap versus the expected/learned gap exceeds a threshold and is outside of an acceptable range, then Demand Defrost is initiated. But if the monitored actual gap versus the expected/learned gap is within the acceptable range and does not exceed the threshold, then the method includes checking guardrails. If the guardrails are within an acceptable range, the method reverts back to the refrigeration process. But if the guardrails are in violation, then the method includes a Safeguard Defrost.

Figure 2:
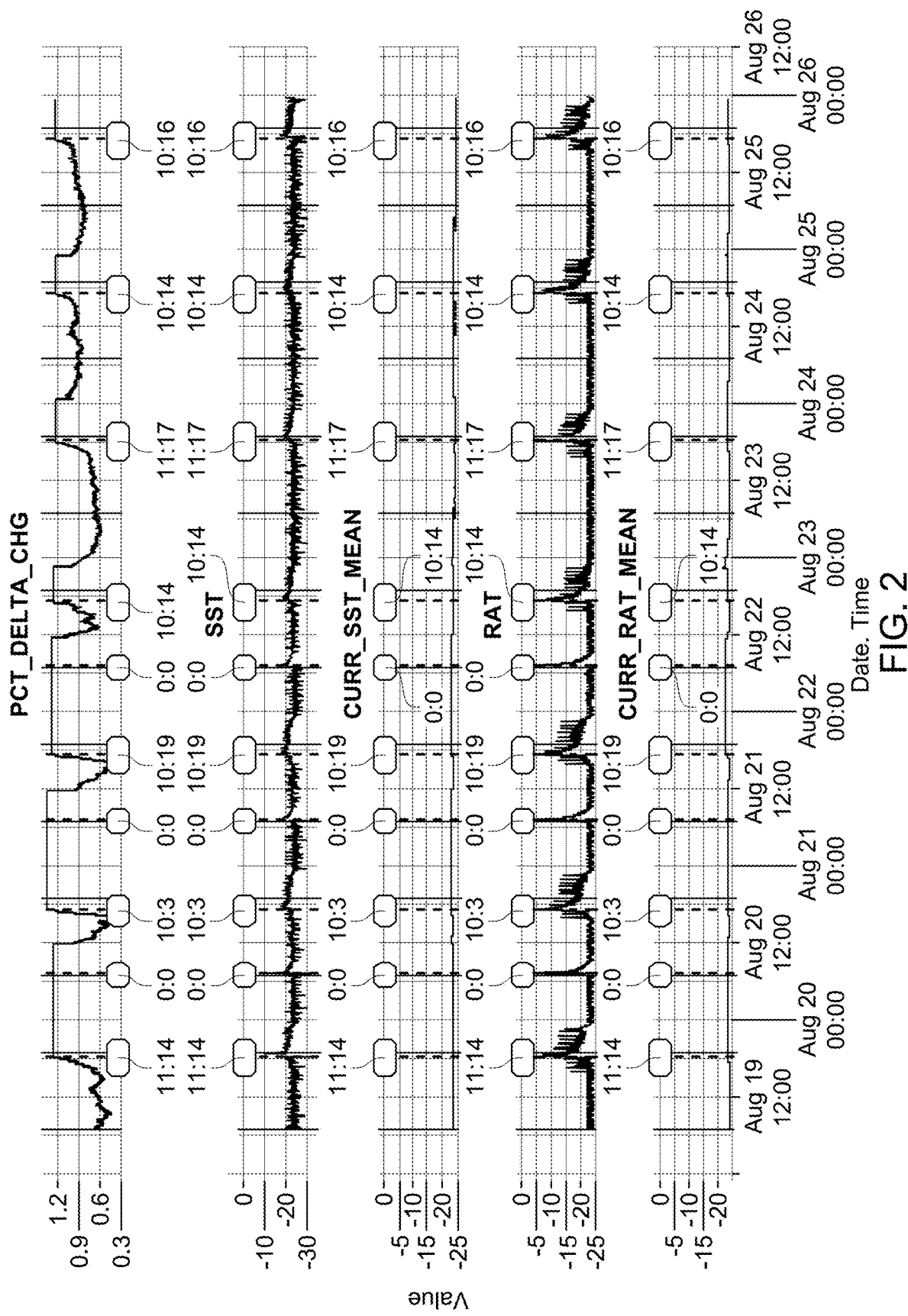

FIG. 2 is an exemplary line graph of defrost cycles versus time. The solid vertical lines indicate times at which a defrost cycle would occur following the schedule for this particular walk-in. The dashed vertical lines indicate times where a defrost is triggered by Demand according to exemplary embodiments of the present disclosure.

Corresponding reference numerals may indicate corresponding (though not necessarily identical) parts throughout the several views of the drawings.

DETAILED DESCRIPTION

Example embodiments will now be described more fully with reference to the accompanying drawings.

Conventional walk-in freezers are configured to automatically defrost according to a scheduled frequency of a set amount of defrosts per day. But as recognized herein, automatically defrosting a walk-in freezer according to a set schedule tends to be energy inefficient and may expose products within the walk-in freezer to low temperature.

Accordingly, exemplary embodiments were developed and/or are disclosed herein of methods and controllers configured to be operable for on demand initiation of a defrost cycle, e.g., Demand Defrost when necessary as opposed to automatically initiating defrost cycles according to a predetermined scheduled frequency of a set amount of defrost cycles per day.

In exemplary embodiments, the controller leverages the knowledge of monitoring Control Temperature (CT) (e.g. Return Air Temperature (RAT), etc.) and Saturated Suction Temperature (SST) and assigning an optimal threshold for the expected/learned gap between the aforementioned temperatures. When the actual gap measured in real time consistently exceeds a defined threshold of the expected/learned gap, a defrost is triggered. The defined threshold may be found to be optimal with data analysis.

Following a defrost, the controller enters or executes a machine learning process for a determined amount of time during which the controller learns a current expected/learned gap between the Control Temperature (CT) and Saturated Suction Temperature (SST). At the end of the machine learning time period, the expected/learned gap is averaged with the previous period's expected/learned gap to make up this period's expected/learned gap. The current expected/learned gap is calculated with a smoothed value for CT and SST. The smoothing is done on a provisional basis.

With further regard to the smoothing function on the values of the Control Temperature (CT) and Saturated Suction Temperature (SST), the formula is:

Mean is weighted to account for previous trends while incorporating current observations.

Variance is weighted distances from current and previous means also factoring in the variance of previous time periods.

The smoothing factor is a predefined metric scaled to consider the mean and variance at multiple time periods when desired.

The smoothing factor is employed to make the data steadier overtime, and therefore dampening the impact of any unexpected deviations in the real time data values. This help stop defrosts from triggering too early following an erroneous change in the observed values.

In exemplary embodiments, a Dynamic Pulldown is in place such that the machine learning process is not learning and leveraging bad data. This may be implemented to primarily address concerns with the state of the coils post-defrost. Following a pulldown violation, the maximum allowed time between defrosts is adjusted on the fly. Following a violation, the maximum time between defrosts becomes:

$$\frac{24 \text{ hours}}{\text{Number of defrosts}} - \text{time in pulldown}$$

Here, the fraction provides the maximum time between scheduled defrosts, and the subtraction is to account for the amount of time the unit has already spent in pulldown.

In alternative exemplary embodiments, a Count Violations Method is employed for determining when to defrost.

The Count violations Method employs a calculated limit for values at $\mu-3\sigma$ for a lower limit and $\mu+3\sigma$ for an upper limit. Each temperature reading beyond these limits is logged/recorded as a count, and the unit would demand a defrost after a supplied number of counts logged/recorded. The use of the lower or upper limit is flexible to which temperature is of interest. Generally, it has been found that using an upper limit violation with Discharge Air Temperature was a better fit than using a lower limit violation with Saturated Suction Temperature.

FIG. 1 illustrates an exemplary method 100 for on demand initiation of a defrost cycle. As shown, the method 100 includes system preparation at 104 that includes provisionally smoothing Return Air Temperature (RAT) (broadly, Control Temperature (CT)) at 104, provisionally smoothing Saturation Suction Temperature (SST) 108, and providing prior run information at 112.

After the system preparation at 104, the method proceeds to refrigeration at 116. At 120, the method 100 includes monitoring actual gap versus the expected/learned gap between Return Air Temperature (RAT) and Saturation Suction Temperature (SST). If the monitored actual gap versus the expected/learned gap exceeds a threshold and is outside of an acceptable range, then the method 100 includes triggering a Demand Defrost at 124.

But if the monitored actual gap versus the expected/learned gap is within the acceptable range and does not exceed the threshold, then the method 100 includes checking guardrails at 128.

If the guardrails are within an acceptable range and do not exceed a threshold, the method 100 reverts back to the refrigeration at 116.

But if the guardrails are in violation, then the method 100 includes triggering a Safeguard Defrost at 132. After the Safeguard Defrost is complete at 136, the method 100 returns to system preparation at 104.

Advantageously, exemplary embodiments disclosed herein may improve the efficiency of walk-in freezers (or other refrigerated spaces) by requiring only necessary defrosts as opposed to defrosts that automatically occur according to a schedule regardless of the current conditions within the walk-in freezer. As disclosed herein, exemplary embodiments disclosed herein may be more energy efficient, less expensive, and more favorable than scheduled automatic defrosts. For example, exemplary embodiments may be more capable of maintaining temperature within the walk-in freezer (therefore keeping products safer within the walk-in freezer) by requiring only necessary defrosts as opposed to scheduled automatic defrosts.

Defrosting less often is desirable because less energy is used by decreasing the frequency of defrosts the unit performs, which is a cost saver. Because the unit does not have to heat up to defrost as frequently, the internal temperature and therefore product temperature are able to stay more stable and preserve food quality.

In exemplary embodiments, the methods/controllers are designed to provide energy and cost savings. The methods/controllers may be configured to provide or be set with a failsafe such that should the Demand Defrosts have the same or possibly even worse energy consumption as compared to Scheduled Defrosts, the methods/controllers will default back to Scheduled Defrosts. Exemplary embodiments may use and rely upon existing sensors that are already in place on units.

In exemplary embodiments, the user may define the minimum and maximum time between defrost constraints. This may be set to be a parameter supplied by the user, in order to implement what the user believes to be good for the user's particular unit. This parameter is influenced by size, load, and product type, therefore user entry and customization of the minimum and maximum time between defrost constraints may be preferred.

In exemplary embodiments, the methods/controllers may be configured to have a learning period that is preferably three hours long. The three-hour learning period has been found to be an optimal or sufficiently long time period, e.g., in order for the coil to be cleared post-defrost to learn. The three-hour learning period may be set as a default learning period value. The default three-hour learning period may thereafter be adjusted (e.g., algorithmically learned via an artificial intelligence (AI) machine learning algorithm, etc.) to a different needed time span.

Exemplary embodiments may include a hierarchy system to control for defrosts of cases that are on a rack and therefore cannot all defrost simultaneously. In such exemplary embodiments, a controller may be configured to make a decision and create an order of which cases are allowed to defrost on the fly, e.g., based off of supplied values of interest, etc.

Exemplary embodiments disclosed herein may be suitable for various applications, such as with existing logic disclosed for case lineups, etc. By comparison to conventional technology that uses an arithmetic mean (a standard methodology), exemplary embodiments disclosed provide an improvement for multiple points. For example, exemplary embodiments are configured such that the mean value is continuously smoothed by the factor of a running distance from the current calculated mean. This smoothing is performed on a provisional basis. Also, the thresholds that are leveraged in exemplary embodiments are a ratio, which includes the value of the previous cycle as a weighted average, and they do not utilize previous cycle data and refresh after each cycle.

Exemplary embodiments are configured to employ a temporary fallback approach. In the event that learning is deemed unfit to continue in Demand mode or if the application is not showing compatibility with Demand mode, the original scheduled defrost pattern may be implemented. Exemplary embodiments may employ additional guardrails to temporarily fallback on the schedule. A fallback approach may be employed when demand is not performing at peak capability, e.g., underlying guardrails in the logic may be provided to help maintain food safety by keeping the case in control, etc.

Conventional technology may leverage the mass flow of refrigerant in the evaporator, which requires having a flow meter installed. By comparison, exemplary embodiments disclosed herein do not necessarily require a flow meter, thereby eliminating the need for an additional sensor, flow meter, or other device to be installed on the unit, which is improvement in less required hardware to operate.

By way of example, a controller disclosed herein may comprise a Case Controller 200 (CC200) controller that is configured (e.g., via a firmware change, algorithmically configured via artificial intelligence (AI) machine learning algorithm(s), provided with application programming or software, etc.) to be operable for on demand initiation of a defrost cycle as disclosed herein. In such exemplary embodiments, the controller may include one or more features as disclosed in Appendix A of U.S. Provisional Application No. 63/446,758 filed Feb. 17, 2023. The contents of U.S. Provisional Application No. 63/446,758 and its Appendix A are incorporated herein by reference in their entirety. Accordingly, exemplary embodiments may include a controller having one or more features identical to or similar to a CC200 controller. For example, an exemplary embodiment may include a controller that is a microprocessor-based controller for use in controlling temperature and Superheat in refrigerated fixtures and walk-in boxes. The controller may be suitable for medium and low temperature applications and can control all loads in a refrigerated box or fixture for up to three evaporator coils. These include lighting, fans, defrost heaters, solenoid valves, stepper valves, and pulse width modulation valves.

The exemplary embodiments of the controllers disclosed herein (e.g., a CC200 controller, other controller, etc.) may be used in various types of systems and applications, e.g., evaporators, walk-in freezers, walk-in coolers, other refrigerated cases or spaces, in the cloud, etc. Accordingly, the exemplary controllers disclosed herein are not limited to use in any one particular type of system and/or refrigerated space, etc.

In exemplary embodiments, a controller is configured to be operable for: triggering a defrost cycle when a gap between Control Temperature (CT) and Saturated Suction Temperature (SST) exceeds a defined threshold of an expected/learned gap between the Control Temperature (CT) and Saturated Suction Temperature (SST); following the defrost cycle, executing a machine learning process for a determined amount of time during which the controller learns a current expected/learned gap between the Control Temperature (CT) and Saturated Suction Temperature (SST); and averaging the current expected/learned gap with a previous expected/learned gap, which was machine learned by the controller following a previous defrost cycle, to thereby provide an average expected/learned gap usable by the controller as the previous expected/learned gap following the next defrost cycle.

In exemplary embodiments, the controller is configured to be operable for smoothing values of the Control Temperature (CT) and Saturated Suction Temperature (SST) on a provisional basis when the controller is machine learning the current expected/learned gap between the Control Temperature (CT) and Saturated Suction Temperature (SST).

In exemplary embodiments, the controller is configured to employ a smoothing factor on the values of the Control Temperature (CT) and Saturated Suction Temperature (SST) whereby: mean is weighted to account for previous trends while incorporating current observations; variance is weighted distances from current and previous means also factoring in the variance of previous time periods; and smoothing factor is a predefined metric scaled to consider the mean and the variance at multiple time periods when desired.

In exemplary embodiments, the controller is configured to employ a smoothing factor on the values of the Control Temperature (CT) and Saturated Suction Temperature (SST) to make the data steadier overtime thereby dampening the impact of any unexpected deviations in the real time data values, and inhibiting the triggering of defrost cycles prematurely following an erroneous change in the observed values.

In exemplary embodiments, the controller is configured to be operable for: checking guardrails for a violation if the gap between the Control Temperature (CT) and Saturated Suction Temperature (SST) does not exceed the defined threshold of the expected/learned gap between the Control Temperature (CT) and Saturated Suction Temperature (SST); and triggering a Safeguard Defrost if the guardrails are in violation. The guardrails may include a dynamic pulldown guardrail to inhibit the controller from learning and leveraging bad data during the machine learning process, and a time-based guardrail to error on the side of not defrosting too much (e.g., heating up contents and wasting energy) or not defrosting too little (e.g., coils risk icing up and control over the system is lost). Examples of time-based guardrails include minimum time between defrosts and maximum time between defrosts.

In exemplary embodiments, the controller is configured to be operable with a dynamic pulldown threshold to inhibit the controller from learning and leveraging bad data during the machine learning process, whereby following a pulldown violation, a maximum allowed time between defrosts is adjusted on the fly. The controller may be configured to determine the maximum allowed time between defrosts by dividing twenty-four hours by a scheduled number of defrosts and then subtracting the amount of time already spent in pulldown.

In exemplary embodiments, the controller is configured to fallback on an original predetermined scheduled frequency of defrost cycles when one or more defined criteria are satisfied.

In exemplary embodiments, the controller is configured to be operable to fallback on an original predetermined scheduled frequency of defrost cycles when one or more of: machine learning is deemed unfit to continue in Demand mode; incompatibility with Demand mode occurs; Demand mode is not performing at peak capability; and/or one or more underlying guardrails are violated and a Safeguard Defrost should be triggered.

In exemplary embodiments, the controller is configured to be operable for establishing, via machine learning, the expected/learned gap between the Control Temperature (CT) and Saturated Suction Temperature (SST). The controller may be configured to algorithmically learn, via an artificial intelligence (AI) machine learning algorithm, the expected/learned gap between the Control Temperature (CT) and Saturated Suction Temperature (SST).

In exemplary embodiments, the controller is configured to be operable for defining, via machine learning, the defined threshold of the expected/learned gap between the Control Temperature (CT) and Saturated Suction Temperature (SST). The controller may be configured to algorithmically learn, via an artificial intelligence (AI) machine learning algorithm, the defined threshold of the expected/learned gap between the Control Temperature (CT) and Saturated Suction Temperature (SST).

In exemplary embodiments, the controller is configured to be operable for defining, via data analysis, an optimal threshold as the defined threshold of the expected/learned gap between the Control Temperature (CT) and Saturated Suction Temperature (SST). By way of example, observed data from the unit within the controller may be fed through a series of tests, including trial-and-error and photo analysis of the coil state to find the optimal threshold gap between the return air and the supply (saturated suction) air temperatures. The threshold may be set by application type (e.g., walk-in versus reach-in have a different threshold).

In exemplary embodiments, the controller is configured to be operable for allowing a user input of the defined threshold of the expected/learned gap between the Control Temperature (CT) and Saturated Suction Temperature (SST).

In exemplary embodiments, the controller is configured to be operable for: monitoring the Control Temperature (CT) and Saturated Suction Temperature (SST); determining the actual gap in real time between the monitored Control Temperature (CT) and Saturated Suction Temperature (SST); and triggering a defrost cycle when the actual gap in real time between the monitored Control Temperature (CT) and Saturated Suction Temperature (SST) consistently exceeds the threshold of the expected/learned gap between the Control Temperature (CT) and Saturated Suction Temperature (SST). By way of example, "consistently exceed" may be explained by a Demand Defrost that is triggered only after a few sequential points are violating the threshold, such that a single point above and then dropping back down would not trigger Demand Defrost. The amount of time (points) required to trigger is defined within the system.

In exemplary embodiments, the Control Temperature (CT) is Return Air Temperature (RAT).

In exemplary embodiments, a controller is configured to be operable for determining when to trigger a defrost cycle by employing a calculated limit for values at $\mu-3\sigma$ for a lower limit and $\mu+3\sigma$ for an upper limit. Each temperature reading that is above the upper limit or less than the lower limit is logged or recorded as a count and a defrost cycle is triggered after a defined number of counts has been logged or recorded.

In exemplary embodiments, the controller is configured to be operable for using Discharge Air Temperature for the calculated limit at $\mu+3\sigma$ for the upper limit.

In exemplary embodiments, the controller is configured to be operable for using Saturated Suction Temperature for the calculated limit at $\mu-3\sigma$ for the lower limit.

In exemplary embodiments, the controller is configured to be operable for determining a hierarchal order of which of a plurality of cases on a rack that cannot all defrost simultaneously are allowed to defrost on the fly.

In exemplary embodiments, the controller is a microprocessor-based controller usable in controlling temperature, superheat, and defrost in a refrigerated fixture, walk-in box, walk-in freezer, walk-in cooler, or other refrigerated space.

In exemplary embodiments, the controller is configured to be operable for controlling initiation of a defrost cycle of an evaporator heat exchanger of a refrigeration system operatively associated with a refrigerated space.

In exemplary embodiments, a refrigeration system comprises an evaporator heat exchanger and a controller as disclosed herein. The controller is configured to be operable for controlling initiation of defrost cycles of the evaporator heat exchanger.

Also disclosed are exemplary methods that comprise triggering a defrost cycle when a gap between Control Temperature (CT) and Saturated Suction Temperature (SST) exceeds a defined threshold of an expected/learned gap between the Control Temperature (CT) and Saturated Suction Temperature (SST); following the defrost cycle, executing a machine learning process for a determined amount of time during which the method learns a current expected/learned gap between the Control Temperature (CT) and Saturated Suction Temperature (SST); and averaging the current expected/learned gap with a previous expected/learned gap, which was machine learned by the method following the previous defrost cycle, to thereby provide an average expected/learned gap usable by the method as the previous expected/learned gap following the next defrost cycle.

In exemplary embodiments, the method includes smoothing values of the Control Temperature (CT) and Saturated Suction Temperature (SST) on a provisional basis when machine learning the current expected/learned gap between the Control Temperature (CT) and Saturated Suction Temperature (SST).

In exemplary embodiments, the method includes employing a smoothing factor on the values of the Control Temperature (CT) and Saturated Suction Temperature (SST) whereby: mean is weighted to account for previous trends while incorporating current observations; variance is weighted distances from current and previous means also factoring in the variance of previous time periods; and smoothing factor is a predefined metric scaled to consider the mean and the variance at multiple time periods when desired.

In exemplary embodiments, the method includes employing a smoothing factor on the values of the Control Temperature (CT) and Saturated Suction Temperature (SST) to make the data steadier overtime thereby dampening the impact of any unexpected deviations in the real time data values, and inhibiting the triggering of defrost cycles prematurely following an erroneous change in the observed values.

In exemplary embodiments, the method includes: checking guardrails for a violation if the gap between the Control Temperature (CT) and Saturated Suction Temperature (SST) does not exceed the defined threshold of the expected/learned gap between the Control Temperature (CT) and Saturated Suction Temperature (SST); and triggering a Safeguard Defrost if the guardrails are in violation.

In exemplary embodiments, the method includes: employing a dynamic pulldown guardrail to inhibit the controller from learning and leveraging bad data during the machine learning process; and employing a time-based guardrail to error on the side of not defrosting too much or defrosting too little.

In exemplary embodiments, the method includes employing a dynamic pulldown threshold to inhibit learning and leveraging bad data during the learning period, whereby following a pulldown violation, the method includes adjusting a maximum allowed time between defrosts on the fly. The method may include determining the maximum allowed time between defrosts by dividing twenty-four hours by a scheduled number of defrosts and then subtracting the amount of time already spent in pulldown.

In exemplary embodiments, the method includes falling back on an original predetermined scheduled frequency of defrost cycles when one or more defined criteria are satisfied.

In exemplary embodiments, the method includes falling back on an original predetermined scheduled frequency of defrost cycles when one or more of: machine learning is deemed unfit to continue in Demand mode; incompatibility with Demand mode occurs; Demand mode is not performing at peak capability; and/or one or more underlying guardrails are violated and a Safeguard Defrost should be triggered.

In exemplary embodiments, the method includes establishing, via machine learning, the expected/learned gap between the Control Temperature (CT) and Saturated Suction Temperature (SST). The method may include algorithmically learning, via an artificial intelligence (AI) machine learning algorithm, the expected/learned gap between the Control Temperature (CT) and Saturated Suction Temperature (SST).

In exemplary embodiments, the method includes defining, via machine learning, the defined threshold of the expected/learned gap between the Control Temperature (CT) and Saturated Suction Temperature (SST). The method may include algorithmically learning, via an artificial intelligence (AI) machine learning algorithm, the defined threshold of the expected/learned gap between the Control Temperature (CT) and Saturated Suction Temperature (SST).

In exemplary embodiments, the method includes defining, via data analysis, an optimal threshold as the defined threshold of the expected/learned gap between the Control Temperature (CT) and Saturated Suction Temperature (SST).

In exemplary embodiments, the method includes allowing a user input of the defined threshold of the expected/learned gap between the Control Temperature (CT) and Saturated Suction Temperature (SST).

In exemplary embodiments, the method includes: monitoring the Control Temperature (CT) and Saturated Suction Temperature (SST); determining the actual gap in real time between the monitored Control Temperature (CT) and Saturated Suction Temperature (SST); and triggering a defrost cycle when the actual gap in real time between the monitored Control Temperature (CT) and Saturated Suction Temperature (SST) consistently exceeds the threshold of the expected/learned gap between the Control Temperature (CT) and Saturated Suction Temperature (SST).

In exemplary embodiments of the method, the Control Temperature (CT) is Return Air Temperature (RAT).

Also disclosed are exemplary methods of determining when to trigger a defrost cycle comprising: employing a calculated limit for values at $\mu-3\sigma$ for a lower limit and $\mu+3\sigma$ for an upper limit; logging or recording each temperature reading that is above the upper limit or less than the lower limit as a count; and triggering a defrost cycle after a defined number of counts has been logged or recorded.

In exemplary embodiments, the method includes using Discharge Air Temperature for the calculated limit at $\mu+3\sigma$ for the upper limit.

In exemplary embodiments, the method includes using Saturated Suction Temperature for the calculated limit at $\mu-3\sigma$ for the lower limit.

In exemplary embodiments, the method includes determining a hierarchal order of which of a plurality of cases on a rack that cannot all defrost simultaneously are allowed to defrost on the fly.

In exemplary embodiments, the method is performed by a microprocessor-based controller usable in controlling temperature, superheat, and defrost in a refrigerated fixture, walk-in box, walk-in freezer, walk-in cooler, or other refrigerated space.

In exemplary embodiments, the method includes controlling initiation of a defrost cycle of an evaporator heat exchanger of a refrigeration system operatively associated with a refrigerated space.

In exemplary embodiments, a refrigeration system comprises an evaporator heat exchanger and a controller configured to perform a method as disclosed herein. The controller is configured to be operable for controlling initiation of defrost cycles of the evaporator heat exchanger.

As will be appreciated based on the foregoing specification, the above-described embodiments of the disclosure may be implemented using computer programming or engineering techniques including computer software, firmware, hardware, or any combination or subset thereof. Exemplary embodiments may include one or more processors and memory coupled to (and in communication with) the one or more processors. A processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

It should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, other optical disk storage, magnetic disk storage or other magnetic storage devices, any other type of volatile or nonvolatile physical or tangible computer-readable media, or other medium that can be used to carry or store desired program code in the form of instructions or data structures and that can be accessed by a computer. Combinations of the above should also be included within the scope of computer-readable media.

Computer-executable instructions may be stored in the memory for execution by a processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

It should also be appreciated that one or more aspects of the present disclosure transform a general-purpose computing device into a special-purpose computing device when configured to perform the functions, methods, and/or processes described herein.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller configured to be operable for:
    triggering a defrost cycle when a gap between Control Temperature (CT) and Saturated Suction Temperature (SST) exceeds a defined threshold of an expected/learned gap between the Control Temperature (CT) and Saturated Suction Temperature (SST);
    following the defrost cycle, executing a machine learning process for a determined amount of time during which the controller learns a current expected/learned gap between the Control Temperature (CT) and Saturated Suction Temperature (SST); and
    averaging the current expected/learned gap with a previous expected/learned gap, which was machine learned by the controller following a previous defrost cycle, to thereby provide an average expected/learned gap usable by the controller as the previous expected/learned gap following the next defrost cycle.

2. The controller of claim 1, wherein the controller is configured to be operable for smoothing values of the Control Temperature (CT) and Saturated Suction Temperature (SST) on a provisional basis when the controller is machine learning the current expected/learned gap between the Control Temperature (CT) and Saturated Suction Temperature (SST).

3. The controller of claim 1, wherein the controller is configured to be operable for:
    checking guardrails for a violation if the gap between the Control Temperature (CT) and Saturated Suction Temperature (SST) does not exceed the defined threshold of the expected/learned gap between the Control Temperature (CT) and Saturated Suction Temperature (SST); and
    triggering a Safeguard Defrost if the guardrails are in violation.

4. The controller of claim 1, wherein the controller is configured to be operable with a dynamic pulldown threshold, and to adjust a maximum allowed time between defrosts based on the dynamic pulldown threshold.

5. The controller of claim 4, wherein the controller is configured to determine the maximum allowed time between defrosts by dividing twenty-four hours by a scheduled number of defrosts and then subtracting the amount of time already spent in pulldown.

6. The controller of claim 1, wherein the controller is configured to fallback on an original predetermined scheduled frequency of defrost cycles when one or more defined criteria are satisfied.

7. The controller of claim 1, wherein the controller is configured to be operable to fallback on an original predetermined scheduled frequency of defrost cycles based on an evaluation that indicates ineffective defrosting.

8. The controller of claim 1, wherein the controller is configured to be operable for establishing, via machine learning, the expected/learned gap between the Control Temperature (CT) and Saturated Suction Temperature (SST).

9. The controller of claim 1, wherein:
the controller is configured to be operable for defining, via machine learning, the defined threshold of the expected/learned gap between the Control Temperature (CT) and Saturated Suction Temperature (SST); and/or
the controller is configured to be operable for defining, via data analysis, an optimal threshold as the defined threshold of the expected/learned gap between the Control Temperature (CT) and Saturated Suction Temperature (SST); and/or
the controller is configured to be operable for allowing a user input of the defined threshold of the expected/learned gap between the Control Temperature (CT) and Saturated Suction Temperature (SST).

10. The controller of claim 1, wherein the controller is configured to be operable for:
monitoring the Control Temperature (CT) and Saturated Suction Temperature (SST);
determining the actual gap in real time between the monitored Control Temperature (CT) and Saturated Suction Temperature (SST); and
triggering a defrost cycle when the actual gap in real time between the monitored Control Temperature (CT) and Saturated Suction Temperature (SST) exceeds the threshold of the expected/learned gap between the Control Temperature (CT) and Saturated Suction Temperature (SST) for a predetermined duration.

11. The controller of claim 1, wherein the Control Temperature (CT) is Return Air Temperature (RAT).

12. The controller of claim 1, wherein the controller is configured to be operable for determining a hierarchal order of which of a plurality of cases on a rack that cannot all defrost simultaneously are allowed to defrost.

13. The controller of claim 1, wherein:
the controller is a microprocessor-based controller usable in controlling temperature, superheat, and defrost in a refrigerated fixture, walk-in box, walk-in freezer, walk-in cooler, or other refrigerated space, and/or
the controller is configured to be operable for controlling initiation of a defrost cycle of an evaporator heat exchanger of a refrigeration system operatively associated with a refrigerated space.

14. A method comprising:
triggering a defrost cycle when a gap between Control Temperature (CT) and Saturated Suction Temperature (SST) exceeds a defined threshold of an expected/learned gap between the Control Temperature (CT) and Saturated Suction Temperature (SST);
following the defrost cycle, executing a machine learning process for a determined amount of time during which the method learns a current expected/learned gap between the Control Temperature (CT) and Saturated Suction Temperature (SST); and
averaging the current expected/learned gap with a previous expected/learned gap, which was machine learned by the method following a previous defrost cycle, to thereby provide an average expected/learned gap usable by the method as the previous expected/learned gap following the next defrost cycle.

* * * * *